Patented Mar. 9, 1926.

1,575,967

UNITED STATES PATENT OFFICE.

EDWARD R. BRODTON, OF PHILADELPHIA, PENNSYLVANIA.

FLUID FOR INDUSTRIAL PURPOSES.

No Drawing.  Application filed February 20, 1925. Serial No. 10,690.

*To all whom it may concern:*

Be it known that I, EDWARD R. BRODTON, a resident of Philadelphia, Pennsylvania, and a citizen of the United States, have invented certain new and useful Improvements in Fluids for Industrial Purposes, of which the following is a specification.

My invention has for its object the production of a liquid that will be non-explosive and non-combustible, or non-flammable, will have a low boiling point, and produce a vapor or gas in great volume, be without injurious effect on metals, fabrics or other materials with which it may be used, or to which it may be applied, and inexpensive of production, and which by reason of these properties, or some of them, may be put to many industrial uses, such for example, as the generation of power for driving engines or motors; for extinguishing fires; for use in thermostats requiring a heat-responsive fluid, etc.

My invention resides in the fluid, as set forth or included in the terms or scope of the appended claims.

The liquid which constitutes my invention is definable as one that consists substantially of methylene chloride and exists in a state in which it is non-explosive and non-inflammable, non-corrosive of or without hurtful effect on metals used for industrial purposes, such as brass, copper, aluminum and iron, has a boiling point between 100° and 160° F. and is stable that is, does not separate into its constituents when vaporized, so that upon condensation, it returns to its original form and constitution.

My liquid may be made in various ways.

It may be made by treatment of what is known commercially as "methylene chloride" or "di-chlormethane". This in its commercial state, is both inflammable and explosive and corrosive, and hence wholly unfit and indeed unsafe in many industrial uses. I have discovered that its combustibility is due to the presence of constituents that may be removed by distillation or evaporation at low temperatures approximating the minimum boiling point of my liquid. An example of a liquid that may be obtained commercially and which may be used to produce my liquid shows the following analysis: 87% to 95%, by wt., methylene chloride, ($CH_2Cl_2$), 13% to 5%, by wt., a mixture of methyl chloride, ($CH_3Cl$), 1% to 7% ethyl chloride, ($C_2H_5Cl$), 1% to 7% chloroform, ($CHCl_3$), 1% to 2%.

What I claim is:

1. A fluid that consists substantially of methylene chloride, is non-inflammable, non-corrosive of brass, copper, aluminum and iron and has a boiling point below that of water and above 100° F.

2. A liquid which is vaporizable by the application of heat for use in driving engines or motors that consists substantially of methylene chloride, is non-inflammable, non-corrosive of brass, copper, aluminum and iron, and has a boiling point below the boiling point of water.

In testimony whereof I hereunto affix my signature.

EDWARD R. BRODTON.